United States Patent Office 3,063,949
Patented Nov. 13, 1962

3,063,949
HOMOPOLYMER OF BIS(2,3-EPOXY-CYCLOPENTYL) ETHER
Benjamin Phillips and Paul S. Starcher, Charleston, W. Va., assignors to Union Carbide Corporation, a corporation of New York
No Drawing. Continuation of application Ser. No. 629,474, Dec. 20, 1956. This application Aug. 25, 1959, Ser. No. 835,824
1 Claim. (Cl. 260—2)

This invention relates to epoxide compositions. More particularly, this invention is directed to curable epoxide compositions containing bis(2,3-epoxycyclopentyl) ether, resins prepared therefrom, and to methods for their preparation.

Our epoxide resins are infusible solids having outstanding properties which particularly lend their use to many applications in the synthetic resins art. These epoxide resins are insoluble in many organic solvents. They are hard and tough. Thus, they are particularly suited for coating applications wherein protective surfaces which are resistant to wear and chipping are desired. As protective coatings our epoxide resins also resist the corrosive action of acids and bases and thus provide protection against such chemicals. These resins adhere tenaciously to a variety of materials including such nonporous materials as glass and steel and may be employed as protective coatings and adhesives for these materials.

Our resins can be made with high heat strengths enabling them to be used for supporting loads at high temperatures. They can be used, for example, in the manufacture of structural parts wherein load supporting capabilities at high temperatures are required. Conduits for carrying hot fluids, tools, dies to be used at high temperatures and the like are advantageously manufactured with our resins. Additionally, these resins can be shaped by molding or casting, as desired. They can be shaped by machining and polished to provide various shaped articles having smooth, polished surfaces. During the molding or casting operation little or no shrinkage of the resin occurs in the mold to provide molded articles carrying the exact details of the mold.

Curable epoxide compositions from which our resins can be made are of low viscosity, of the magnitude of about 28 centipoises at 27° C. As the temperature increases the viscosities of the compositions decrease. These compositions can be easily handled at room temperatures or higher and are capable of filling small intricacies of molds into which they are poured. Other ingredients can be added to modify resin properties, to provide coloration and provide other effects, if desired, without increasing the viscosity of these compositions to the extent where they become unwieldy and hard to handle. The viscosity of these compositions can be increased by the addition of fillers which in fact can enhance the physical properties of resins produced therefrom. As coatings, these compositions, with or without other ingredients, can be readily sprayed, brushed or spread without the need of a solvent or thinner although one may be employed, if desired. Thus, there is no need for driving off a solvent which may cause the formation of bubbles in the cured resin.

In accordance with this invention, hard resins can be produced from compositions containing bis(2,3-epoxycyclopentyl) ether and catalysts. These compositions can be prepared by adding the catalyst to bis(2,3-epoxycyclopentyl) ether and agitating the mixture to make it homogeneous. The composition then can be cured at a temperature in the range from about 25° C. to 200° C. In a preferred method the composition can be formed at temperatures in the range from 0° C. to 30° C. The mixture then can be brought to and maintained at a temperature from 50° C. to 160° C. until a gel, or partially cured solid, is formed. After formation of the gel, the temperature can then be maintained within the range of 100° C. to 200° C. to complete the cure. Many combinations of temperatures or a single temperature, all preferably within the range of 25° C. to 200° C., may be used in curing. High temperatures and particularly temperatures over 250° C. tend to cause extreme discoloration in the cured resin. It is believed that discoloration may be brought about by internal charring due to heat concentrations within the resin during curing. The curing rate is slowed considerably at low temperatures particularly below about 25° C. Catalyst concentrations ranging up to about 5.0 weight percent based on the weight of bis(2,3-epoxycyclopentyl) ether are effective in our compositions. Higher catalyst concentrations above this range are also effective, although concentrations of 5.0 weight percent and below have been found to be adequate. Preferred catalyst concentrations range from 0.01 to 5.0 weight percent based upon the weight of bis(2,3-epoxycyclopentyl) ether. It is particularly preferred, however, to use the catalyst in a concentration of about 0.5 to 3.5 weight percent based upon the weight of bis(2,3-epoxycyclopentyl) ether. The degree of catalyst concentration is believed to affect the curing rate, higher concentrations providing faster curing rates than lower concentrations. It has been observed that heat concentrations caused by applied heat and exothermic heat within the resin and of the degree which can cause internal charring can be avoided by lowering the curing temperature or catalyst concentration, or by lowering both. At higher curing temperatures and higher catalyst concentrations internal charring tends to be encouraged whereas at lower temperatures or lower catalyst concentrations internal charring is avoided.

Catalysts which can be employed with advantageous effects in producing our resins are the ionic catalysts including strong alkalis, mineral acids and metal halide Lewis acids. Typical strong alkalis include the alkali metal hydroxides, e.g., sodium hydroxide and potassium hydroxide, and quaternary ammonium compounds, e.g., benzyltrimethyl-ammonium hydroxide, tetramethyl ammonium hydroxide and the like. Representative mineral acids which can be used as catalysts include sulfuric acid, phosphoric acid, perchloric acid, polyphosphoric acid and the various sulfonic acids, such as, toluene sulfonic acid, benzene sulfonic acid and the like. Metal halide Lewis acids which are effective in producing our resins include boron trifluoride, stannic chloride, zinc chloride, aluminum chloride, ferric chloride and the like. The metal halide Lewis acid catalysts can also be used in the form of such complexes as etherate complexes and amine complexes, for example, boron trifluoride-piperidine and boron trifluoride-monoethylamine complexes. In the form of a complex, the metal halide Lewis acid catalyst is believed to remain substantially inactive until released as by dissociation of the complex upon increasing the temperature. When released from the complex, the catalyst then exerts its catalytic effect.

Uniform dispersion of catalyst in bis(2,3-epoxycyclopentyl) ether prior to curing has been found to be desirable in order to obtain homogeneous resins and to avoid localized curing around catalyst particles. Agitation of our compositions containing bis(2,3-epoxycyclopentyl) ether and catalyst is adequate when the catalyst is miscible with bis(2,3-epoxycyclopentyl) ether. When the catalyst is immiscible in bis(2,3-epoxycyclopentyl) ether, it can be added as a solution in a suitable solvent. Typical solvents for the acidic and basic catalysts include organic ethers, e.g., diethyl ether, dipropyl ether, 2-methoxy-1-propanol, organic esters, e.g., methyl acetate, ethyl acetate, ethyl-propionate, organic ketones, e.g., acetone, methyl-isobutyl-ketone, cyclohexanone, organic alcohols, e.g., methanol, cyclohexanol, propylene glycol and the like. The mineral acids and strong bases can be employed as solutions in water, whereas metal halide Lewis acid catalysts tend to decompose in water and aqueous solutions of such Lewis acids are not preferred.

While not wishing to be bound by any particular theory or mechanics of reaction, it is believed that the curing reaction involves the etherification of epoxy groups,

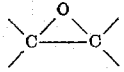

to form carbon to oxygen to carbon bonds linking and cross-linking the monomeric molecules. Thus, our resins can be characterized as having recurring interconnected units of the following formula:

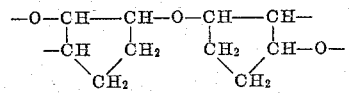

It is believed that the carbon to oxygen to carbon linkages because of their stability and resistance to many chemical reagents are to a large degree responsible for valuable physical properties, e.g., toughness, heat strength, resistance to organic solvents and the like, of our resins. Furthermore, it is thought that the presence of cyclic groups serves to improve the load carrying capabilities of our resins at high temperatures.

Valuable resins can be obtained also by the reaction of bis(2,3-epoxycyclopentyl) ether with polyfunctional materials which contain at least two groups capable of reacting with epoxy groups. Inclusive of such polyfunctional materials are polycarboxylic acids, polycarboxylic acid anhydrides, polyhydric alcohols, primary amines, polyamines, amides, polyamides, imines, polyimines, imides, polyimides, polythiols, other epoxies and polyepoxides and the like.

Bis(2,3-epoxycyclopentyl) ether is a liquid diepoxy dicyclic aliphatic ether having a viscosity of about 28 centipoises at 27° C. This ether can be prepared by the epoxidation of the olefinic bonds of bis(2-cyclopentenyl) ether which, itself, can be made from cyclopentadiene by the successive steps of hydrochlorination and alkaline hydrolysis. In a preferred method, bis(2-cyclopentenyl) ether can be prepared from the reaction of cyclopentadiene with hydrogen chloride in a solvent, e.g., benzene, or without a solvent, for a period of about one hour at a low temperature, such as 0° C. to —15° C., thereby forming 1-chloro-2-cyclopentene. Subsequently, 1-chloro-2-cyclopentene can be subjected to alkaline hydrolysis with an aqueous solution of sodium carbonate or sodium hydroxide at a temperature of the order of 40° C. to 60° C. to form bis(2-cyclopentenyl) ether. A substantially pure bis(2-cyclopentenyl) ether then can be obtained by any suitable separation procedure, for example, fractional distillation.

Suitable epoxidizing agents for the epoxidation include organic peroxides, such as, peracetic acid, acetaldehyde monoperacetate, perbenzoic acid and the like. The epoxidation can be advantageously carried out by charging bis(2-cyclopentenyl) ether to a reaction vessel and then gradually adding the epoxidizing agent. In order to provide ease of handling and to avoid the formation of highly concentrated, or crystalline peracetic acid, with its attendant explosion hazards, the epoxidizing agent preferably is employed as a solution. As solvents for the epoxidizing agents, acetone, chloroform, methylethyl ketone, ethyl acetate, butyl acetate, and the like are representative. The reaction can be carried out at a temperature within the range of about —25° C. to 150° C., although higher and lower temperatures may be used. However, longer reaction times are needed at the lower temperature to produce high yields. At the higher temperatures, side reactions form undesirable materials which can be removed, however, by suitable purification procedures, such as, fractional distillation. The reaction can be continued until an analysis for epoxidizing agent indicates that an amount at least sufficient to epoxidize all the double bonds of the bis(2-cyclopentenyl) ether has been consumed. In this connection it is desirable to employ an excess over the theoretical amount of epoxidizing agent to assure complete epoxidation. Upon discontinuance of the reaction, by-products, solvent and unreacted materials can be removed by any convenient procedure, such as, by adding a potboiler, for example, ethylbenzene, and stripping the low-boiling materials. A liquid material, identified as bis(2,3-epoxycyclopentyl) ether, is obtained. This product partially solidifies on standing at room temperature for 1 to 3 days which indicates the possible formation of one or more solid position isomers. This is semi-solid bis(2,3-epoxycyclopentyl) ether can be liquefied by melting at a temperature of 30° C. to 35° C. and will remain a liquid for a period of several days at room temperature.

The following examples are presented.

EXAMPLE 1

Nine hundred and four grams of a 25.2 percent by weight solution of peracetic acid in acetone, i.e., a solution containing 3.0 moles of peracetic acid, were added slowly to 150 grams, or 1.0 mole, of bis-(2-cyclopentenyl) ether. This addition was accomplished in about 3 hours, during which time the temperature of the reaction mixture was continuously maintained between 26° C. and 30° C. After stirring the reaction mixture for an additional 8 hours at about 30° C. and allowing it to stand at —6° C. for about 40 hours, it was fed into ethylbenzene, refluxing at a temperature of 60° C. at 55 millimeters of mercury, absolute pressure, to remove any acetic acid and excess peracetic acid. Fractional distillation of the residue resulted in 134 grams (a 74.6 percent yield based on the theoretical yield) of bis-(2,3-epoxycyclopentyl) ether having a boiling range of 102–113° C. under a reduced pressure of 2.5–2.8 millimeters of mercury, absolute.

EXAMPLE 2

A mixture comprising 1 gram of bis(2,3-epoxycyclopentyl) ether and 5 drops of a 20 weight percent solution of potassium hydroxide was prepared. This mixture contained about 2 weight percent of potassium hydroxide based on the weight of bis(2,3-epoxycyclopentyl) ether. The mixture was placed in an oven maintained at a temperature of 120° C. The mixture was kept at this temperature for a period of 8 hours after which time the temperature was raised to 160° C. After 10.5 hours at 160° C. the mixture was removed from the oven and cooled to room temperature. A hard, dark brown solid was produced. This solid was infusible.

EXAMPLE 3

A mixture was prepared from 1 gram of bis(2,3-epoxycyclopentyl) ether and 1 drop of a 25 weight percent solution of sulfuric acid in water. This mixture contained about 0.5 weight percent of sulfuric acid based on the weight of bis(2,3-epoxycyclopentyl) ether. The mixture was placed in an oven at a temperature of 120° C. and kept at this temperature for a period of 8 hours, during which time a gel was formed. The temperature was then increased to 160° C. and maintained at this value for 10.5 hours. The mixture was then removed from the oven and cooled to room temperature. A hard, tough, dark brown solid having a Barcol hardness of 35 was produced. This solid was infusible.

EXAMPLE 4

A mixture containing 1 gram of bis(2,3-epoxycyclopentyl) ether and 0.06 gram of boron trifluoride-piperidine complex was prepared. This mixture contained 2.6 weight percent of boron trifluoride base on the weight of bis(2,3-epoxycyclopentyl) ether. This mixture was brought to a temperature of 120° C. and maintained at this temperature for 8 hours, during which time a gel was formed. The temperature then was increased to 160° C. and kept there for a period of 10.5 hours. After this treatment the mixture was cooled to room temperature. There was produced a hard, tough, brown solid having a Barcol hardness of 40 and which was infusible.

EXAMPLES 5 THROUGH 10

Five mixtures, each containing 2 grams of bis(2,3-epoxycyclopentyl) ether and one mixture containing 1 gram of bis(2,3-epoxycyclopentyl) ether and varying amounts, as correspondingly listed in Table I below, of boron trifluoride-monoethylamine complex, were prepared. Each mixture contained the weight percentages of boron trifluoride, based on the weight of bis(2,3-epoxycyclopentyl) ether, as correspondingly listed in Table I. The mixtures of Examples 6 through 9 were heated at 120° C. for a period of 6.5 hours during the first two hours of which the mixtures formed gels. These gels were then maintained at a temperature of 160° C. for 6 hours and hard solid resins having Barcol hardnesses correspondingly listed in Table I were obtained therefrom. The mixture of Example 5 was maintained at 120° C. for 54 hours and then at 160° C. for 6 hours. A firm, solid resin was obtained therefrom. The mixture of Example 10 was maintained at 80° C. for five hours during which time a gel was formed. This gel was kept at 120° C. for 30 minutes and a hard resin having a Barcol hardness of 45 was obtained therefrom. All the resins of Examples 6 through 10 were infusible.

Table I

| Example Number | Weight of Bis(2,3-epoxycyclopentyl) Ether (Grams) | Weight of Complex (Grams) | BF$_3$ Concentration (Wgt. percent) | Properties of Products |
|---|---|---|---|---|
| 5 | 2.0 | 0.03 | .9 | Solid. |
| 6 | 2.0 | 0.04 | 1.2 | Hard. |
| 7 | 2.0 | 0.05 | 1.5 | Hard, tough. |
| 8 | 2.0 | 0.06 | 1.8 | Do. |
| 9 | 2.0 | 0.07 | 2.1 | Hard, tough. Barcol hardness of 30. |
| 10 | 1.0 | 0.04 | 2.4 | Hard, tough, Barcol hardness of 45. |

Barcol hardness values given in the foregoing examples were obtained with a Barcol Impressor GYZJ-934-1.

This application is a continuation of application Serial Number 629,474, now abandoned, filed December 20, 1956.

What is claimed is:

An infusible, solid homopolymer of bis(2,3-epoxycyclopentyl) ether.

References Cited in the file of this patent

UNITED STATES PATENTS

| 2,460,195 | Segall | Jan. 25, 1949 |
| 2,717,885 | Greenlee | Sept. 13, 1955 |
| 2,739,161 | Carlson | Mar. 20, 1956 |
| 2,765,296 | Strain | Oct. 2, 1956 |